(12) United States Patent
Wilkinson et al.

(10) Patent No.: US 6,413,664 B1
(45) Date of Patent: Jul. 2, 2002

(54) FUEL CELL SEPARATOR PLATE WITH DISCRETE FLUID DISTRIBUTION FEATURES

(75) Inventors: David P. Wilkinson, North Vancouver; Olen Vanderleeden, Coquitlam; James T. Dudley, Port Moody, all of (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/471,704

(22) Filed: Dec. 23, 1999

(51) Int. Cl.[7] ............................................... H01M 8/02
(52) U.S. Cl. .......................................... 429/34; 429/34
(58) Field of Search .............................. 429/34, 38, 39

(56) References Cited

U.S. PATENT DOCUMENTS

| | | | | |
|---|---|---|---|---|
| 3,468,712 A | * | 9/1969 | Gillespie | .................. 429/34 X |
| 3,484,298 A | | 12/1969 | Nichols | |
| 4,988,583 A | | 1/1991 | Watkins et al. | ................ 429/30 |
| 5,108,849 A | | 4/1992 | Watkins et al. | ................ 429/30 |
| 5,252,410 A | | 10/1993 | Wilkinson et al. | ............. 429/33 |
| 5,300,370 A | | 4/1994 | Washington et al. | .......... 429/34 |
| 5,432,021 A | | 7/1995 | Wilkinson et al. | ............. 429/17 |
| 5,482,680 A | | 1/1996 | Wilkinson et al. | .......... 422/177 |
| 5,521,018 A | | 5/1996 | Wilkinson et al. | .............. 42/26 |
| 5,641,586 A | * | 6/1997 | Wilson | ...................... 429/34 X |
| 5,798,187 A | | 8/1998 | Wilson et al. | ................. 429/26 |
| 5,840,438 A | | 11/1998 | Johnson et al. | ................ 429/30 |
| 5,863,671 A | | 1/1999 | Spear, Jr. et al. | ............. 429/12 |
| 6,037,075 A | * | 3/2000 | Critz et al. | ............... 429/38 X |
| 6,207,312 B1 | * | 3/2001 | Wynne et al. | ................. 429/34 |

FOREIGN PATENT DOCUMENTS

| | | |
|---|---|---|
| GB | 1151373 | 5/1969 |
| JP | 04-267062 | 9/1992 |

* cited by examiner

*Primary Examiner*—Stephen Kalafut
(74) *Attorney, Agent, or Firm*—McAndrews, Held & Malloy, Ltd.

(57) ABSTRACT

An electrically conductive, substantially fluid impermeable fuel cell separator plate comprises a substantially planar major surface for facing a fluid permeable fuel cell electrode, a fluid inlet through which a fluid may be directed to the planar major surface, a fluid outlet through which fluid may be removed from the planar major surface, and at least one discrete fluid distribution feature, such as a channel, formed in the planar major surface. Within the thickness of the plate, the fluid distribution feature is fluidly isolated from the fluid inlet and the fluid outlet, such that in a fuel cell assembly the reactant fluid must pass through the adjacent fluid permeable electrode to travel between the discrete fluid distribution feature and each of the fluid inlet and the fluid outlet.

28 Claims, 6 Drawing Sheets

FUEL CELL SEPARATOR PLATE WITH DISCRETE FLUID DISTRIBUTION FEATURES

FIELD OF THE INVENTION

The present invention relates to a separator plate for a fuel cell. The separator plate comprises at least one discrete fluid distribution feature such as, for example, an open channel formed in a major surface of the separator plate. More particularly, within the thickness of the separator plate, the fluid distribution feature is fluidly isolated from fluid inlets or outlets.

BACKGROUND OF THE INVENTION

Electrochemical fuel cells convert reactants, namely fuel and oxidants, to generate electric power and reaction products. Electrochemical fuel cells generally employ an electrolyte disposed between two electrodes, namely a cathode and an anode. The electrodes each comprise electrocatalyst disposed at the interface between the electrolyte and the electrodes to induce the desired electrochemical reactions. The location of the electrocatalyst typically defines the electrochemically active area of the electrode. The electrode layers are electrically conductive and fluid permeable, so that the reactant fluids may flow to the electrocatalyst sites from the fuel cell reactant inlet.

The fuel fluid stream which is supplied to the anode may be a gas such as substantially pure hydrogen or a reformate stream comprising hydrogen. Alternatively, a liquid fuel stream such as, for example, aqueous methanol may be used. The oxidant fluid stream, which is supplied to the cathode, typically comprises oxygen, such as substantially pure oxygen, or a dilute oxygen stream such as air.

Solid polymer fuel cells employ a solid polymer electrolyte, or ion exchange membrane. The membrane is typically interposed between two electrode layers, forming a membrane electrode assembly ("MEA"). While the membrane is typically proton conductive, it also acts as a barrier, isolating the fuel and oxidant streams from each other on opposite sides of the MEA. The MEA is typically disposed between two plates to form a fuel cell assembly. The plates act as current collectors and provide support for the adjacent electrodes. The assembly is typically compressed to ensure good electrical contact between the plates and the electrodes, in addition to adequate sealing between fuel cell components.

A plurality of fuel cell assemblies may be combined and electrically connected in series or in parallel, to form a fuel cell stack. In a fuel cell stack, a plate may be shared between two adjacent fuel cell assemblies, in which case the plate also serves as a separator to fluidly isolate the fluid streams of the two adjacent fuel cell assemblies.

Fuel cell plates, known as separator plates, may have open channels formed in one or both opposing major surfaces for directing reactants and/or coolant fluids to specific portions of such major surfaces. The open channels also provide passages for the removal of reaction products, depleted reactant streams, and/or heated coolant streams. U.S. Pat. No. 4,988,583 sets forth figures that illustrate an example of a fuel cell separator plate which has an open serpentine channel formed on a major surface of the plate. In this example, the channel is continuous, that is, fluidly connected to a fluid inlet and to a fluid outlet. U.S. Pat. No. 5,300,370 ("the '370 patent") discloses several fluid channel configurations formed in a major surface of fuel cell separator or flow field plates. For example, FIG. 8 of the '370 patent illustrates a plurality of parallel continuous channels which are each fluidly connected to an inlet and an outlet. FIG. 9 of the '370 patent illustrates a flow field plate that employs discontinuous flow field channels, but each of these channels is fluidly connected by an open-faced channel to one of the fluid inlet or the fluid outlet.

One approach to improving fuel cell performance is to increase the open channel area to increase contact between the reactant streams flowing in the channels and the adjacent electrochemically active area of the adjacent electrode. Performance is improved by increasing the accessibility of the reactant fluids to the electrocatalyst at the interface between the electrolyte and the electrode. A purpose of the open-faced flow field channels formed in the separator plates is to direct the reactant fluids across substantially the whole of the electrochemically active area. These open-faced channels are defined by adjoining "land areas" that contact and support the electrode layer, thereby substantially preventing the electrode from deflecting into the open channel. However, reactant fluids will generally travel through the fuel cell from an inlet to an outlet along the path that offers the lowest pressure loss. The pressure loss sustained when the reactant fluid travels along the channel is typically less than the pressure loss that would be sustained if the reactant fluid were to flow through the fluid permeable electrode. Therefore, when a continuous channel is provided between a fuel cell inlet and a fuel cell outlet, the majority of the reactant fluid stream will travel within the channel and diffuse into the electrode areas mostly in the regions next to the open-faced channels. A problem with conventional flow field arrangements is that reactant fluids typically only have limited access to the electrode areas adjacent the land areas by diffusion, and some degree of "flow" if there is a consistent pressure differential between channels on opposite sides of a land area. For this reason, conventional flow field plates tend to be designed to increase the open channel area and reduce the land areas.

However, because the land areas are needed to support the electrode and provide an electrically conductive path from the electrodes to the separator plates for current collection, a compromise must be made between reducing the size of the land areas to increase direct exposure of the electrodes to the reactant fluid flowing in the channel, and providing sufficiently sized land areas for adequately supporting the electrode layer and providing adequate electrical conductance for current collection.

Since there may be little or no fluid flow to the electrode layer where it contacts the separator plate land areas, water may accumulate within the electrode layer in these areas. The accumulation of water may compound the problem by flooding the electrode in the portions adjacent the land areas, thus making the flooded areas even less accessible to the reactant fluids.

SUMMARY OF THE INVENTION

An electrically conductive, substantially fluid impermeable separator plate for an electrochemical cell comprises:
   (a) a substantially planar major surface for facing a fluid permeable electrode of the electrochemical cell;
   (b) a fluid inlet through which a fluid may be directed to the planar major surface;
   (c) a fluid outlet through which fluid may be removed from the planar major surface;
   (d) at least one discrete fluid distribution feature formed in the planar major surface wherein, within the thickness of the plate, the fluid distribution feature is fluidly isolated from the fluid inlet and the fluid outlet.

In a preferred embodiment, the electrochemical cell is a solid polymer fuel cell.

The discrete fluid distribution feature is preferably a channel that is oriented substantially perpendicular to the direction of fluid flow to and from the discrete distribution channel. That is, unlike conventional flow field channels, where the majority of the fluid travels in the same direction as the channel orientation (along the length of the channel), in preferred embodiments, fluid flowing to/from the discrete fluid distribution channel enters or exits the discrete fluid distribution channel along a flow path that is substantially perpendicular to the longitudinal orientation of the discrete fluid distribution channel. In the present flow field fluid distribution areas where there are discrete fluid distribution channels, in addition to fluid flow along the discrete fluid distribution channel, the fluid is directed across the land areas between adjacent discrete fluid distribution channels and/or adjacent inlet or outlet channels.

For a separator plate that comprises a plurality of discrete fluid distribution channels that are oriented substantially parallel to one another, the fluid preferably flows between adjacent discrete fluid distribution channels in a direction that is perpendicular to the discrete fluid distribution channels.

In embodiments that further comprise inlet or outlet channels extending from, and in fluid communication, with respective inlet or outlet openings or manifolds, the respective inlet or outlet channels are preferably substantially parallel with the at least one discrete fluid distribution channel, and fluid flows between the discrete fluid distribution channel and the inlet or outlet channel in a direction that is substantially perpendicular to the discrete fluid distribution channel and the inlet and/or outlet channels.

In preferred embodiments the discrete fluid distribution channel is oriented substantially perpendicular to a straight line drawn between the fluid inlet and the fluid outlet. In other preferred embodiments the discrete fluid distribution channel is oriented substantially parallel to a straight line drawn between the fluid inlet and the fluid outlet.

The substantially planar major surface of the separator plate preferably comprises a fluid distribution area that corresponds to and is coextensive with the electrochemically active area of the adjacent electrode when the separator plate is part of a fuel cell assembly. The discrete fluid distribution channel is preferably a substantially straight channel that extends substantially between opposing edges of the fluid distribution area. In one preferred embodiment the fluid distribution area is substantially in the shape of a rectangle and the discrete fluid distribution channel is substantially aligned with the longitudinal axis of the fluid distribution area.

A preferred embodiment of the separator plate comprises a hybrid fluid distribution area that comprises one or more serpentine channels and at least one discrete straight fluid distribution channel. For example, the major planar surface comprises at least one serpentine fluid channel that extends from at least one of the fluid inlet and the fluid outlet. The serpentine fluid channel extends over a portion of the planar major surface, while at least one discrete fluid distribution channel extends over another portion of the fluid distribution area.

The separator plate preferably further comprises openings penetrating the plate for forming fluid manifolds when the plate is one of a plurality of plates placed one on top of the other to form a fuel cell stack. The openings are aligned in adjacent plates, and are typically fluidly connected to fluid passages formed in the fuel cell stack end plate assemblies.

The features formed in the major planar surface of the separator plate may be formed by embossing a material comprising expanded graphite. More particularly, when the plate material is a formable material like expanded graphite, any of the plate features, which may include, for example, one or more discrete fluid distribution channels, inlet channel(s), outlet channel(s), grooves for receiving seals, and fluid manifold openings, may be formed by embossing methods.

In another embodiment, the separator plate may be made from a molded composite material comprising carbon. The carbon component provides electrical conductivity and is compatible with the operating environment and the fluids that flow through conventional solid polymer electrolyte fuel cells. As an alternative to using a molding process to form the discrete fluid distribution channel, a die cutter or mill may be employed to cut the discrete channel into the major planar surface of the plate.

The separator plate may be impregnated with resin to improve the desired mechanical properties such as durability, impermeability, and hydrophobicity. The plate is preferably hydrophobic to facilitate the flow of water within the fluid distribution area. It is important to facilitate water flow within the fluid distribution area because water is needed to keep the electrolytic membrane moist to increase its ion conductivity. It is equally important for excess water to be removed from the fluid distribution area to prevent flooding which might prevent reactants from accessing the electrochemically active areas of the electrode.

In a preferred embodiment, the discrete fluid distribution channel has a substantially uniform cross-sectional area along its length. In essence, each of the discrete fluid distribution channels acts as a fluid header for distributing reactant fluid along the length of the discrete channel. A uniform channel cross-section promotes a more even distribution of the reactant along the length of the discrete channel.

The present separator plate is preferably employed in an electrochemical fuel cell stack that comprises:
  (a) a plurality of membrane electrode assemblies comprising a pair of fluid permeable electrodes, wherein each one of the membrane electrode assemblies is interposed between planar major surfaces of two substantially fluid impermeable separator plates; and
  (b) at least one discrete fluid distribution feature (preferably a discrete channel) formed in one of the planar major surface of at least one of the two plates, wherein within the thickness of the respective one of the separator plates, the fluid distribution channel is fluidly isolated such that it is not connected to a fluid inlet or a fluid outlet by any fluid conduits within the thickness of the respective one of the separator plates.

The at least one discrete fluid distribution channel is preferably one of a plurality of discrete fluid distribution channels which are each fluidly isolated within the thickness of the respective one of the flow field plates. The plurality of discrete fluid distribution channels are preferably substantially parallel to one another, so that the reactant fluid flowing across the fluid distribution area is distributed across substantially the entire area.

DETAILED DESCRIPTION OF PREFERRED EMBODIMENTS

Figure 1:
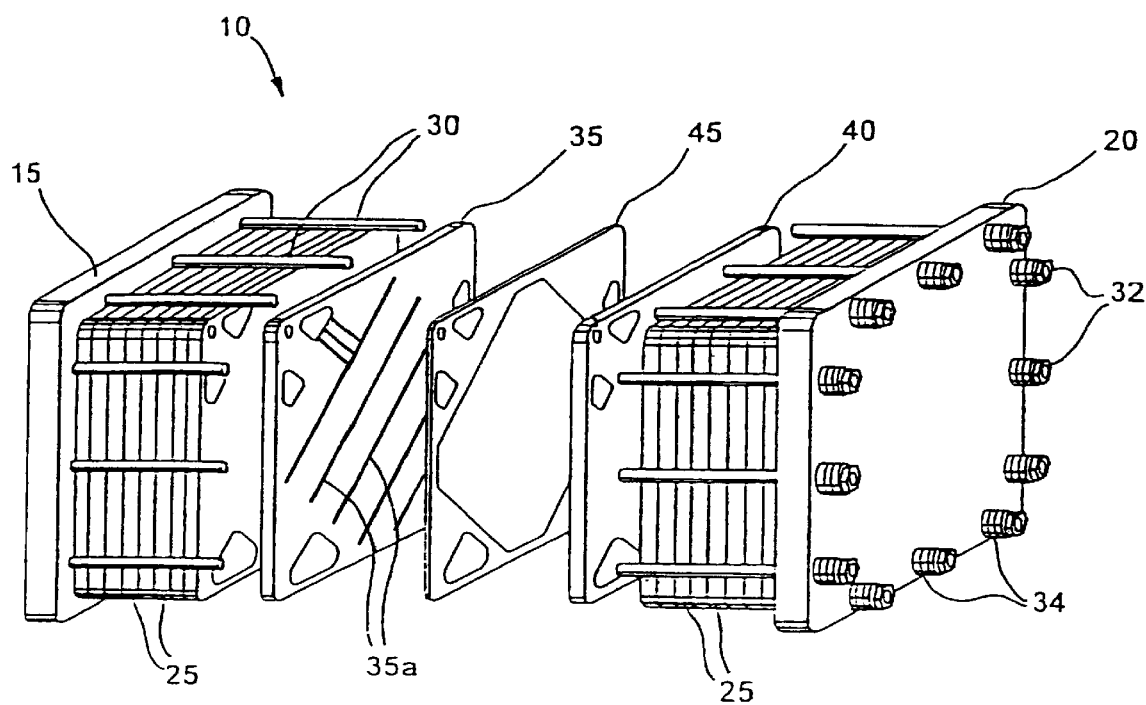
FIG. 1 is an exploded perspective view of a fuel cell stack that comprises a separator plate that has discrete fluid distribution channels.

FIG. 1 illustrates, in exploded view, a solid polymer electrochemical fuel cell stack 10, including a pair of end plate assemblies 15, 20 and a plurality of fuel cell assemblies 25. Tie rods 30 extend between end plate assemblies 15 and 20 to retain and secure stack assembly 10 in its assembled state with fastening nuts 32. Springs 34 disposed on tie rods 30, are interposed between the fastening nuts 32 and the end plate 20 to apply resilient compressive force to the stack in the longitudinal direction. Reactant and optionally coolant fluid streams are supplied to and exhausted from internal manifolds and passages in stack 10 via stack inlet and outlet ports (not shown) in end plate 15.

As shown by the exploded portion of FIG. 1, each fuel cell assembly 25 comprises a MEA 45 which is interposed between two fuel cell separator plates, namely an anode flow field plate 35, and a cathode flow field plate 40. MEA 45 itself comprises an ion exchange membrane interposed between a fluid permeable anode and a fluid permeable cathode.

Anode flow field plate 35 has a plurality of discrete fluid distribution channels 35a formed in its major surface facing MEA 45 to assist with the distribution of a fuel fluid stream across the electrochemically active area of the fluid permeable anode. Cathode flow field plate 40 may also comprise features (not shown), similar to anode flow field plate 35, to assist with the distribution of an oxidant fluid stream across the electrochemically active area of the fluid permeable cathode. For example, cathode flow field plate 40 may comprise features such as discrete and/or continuous channels for distributing oxidant to the cathode from an oxidant inlet and exhausting a cathode exhaust stream from the cathode to an oxidant outlet.

Figure 2:
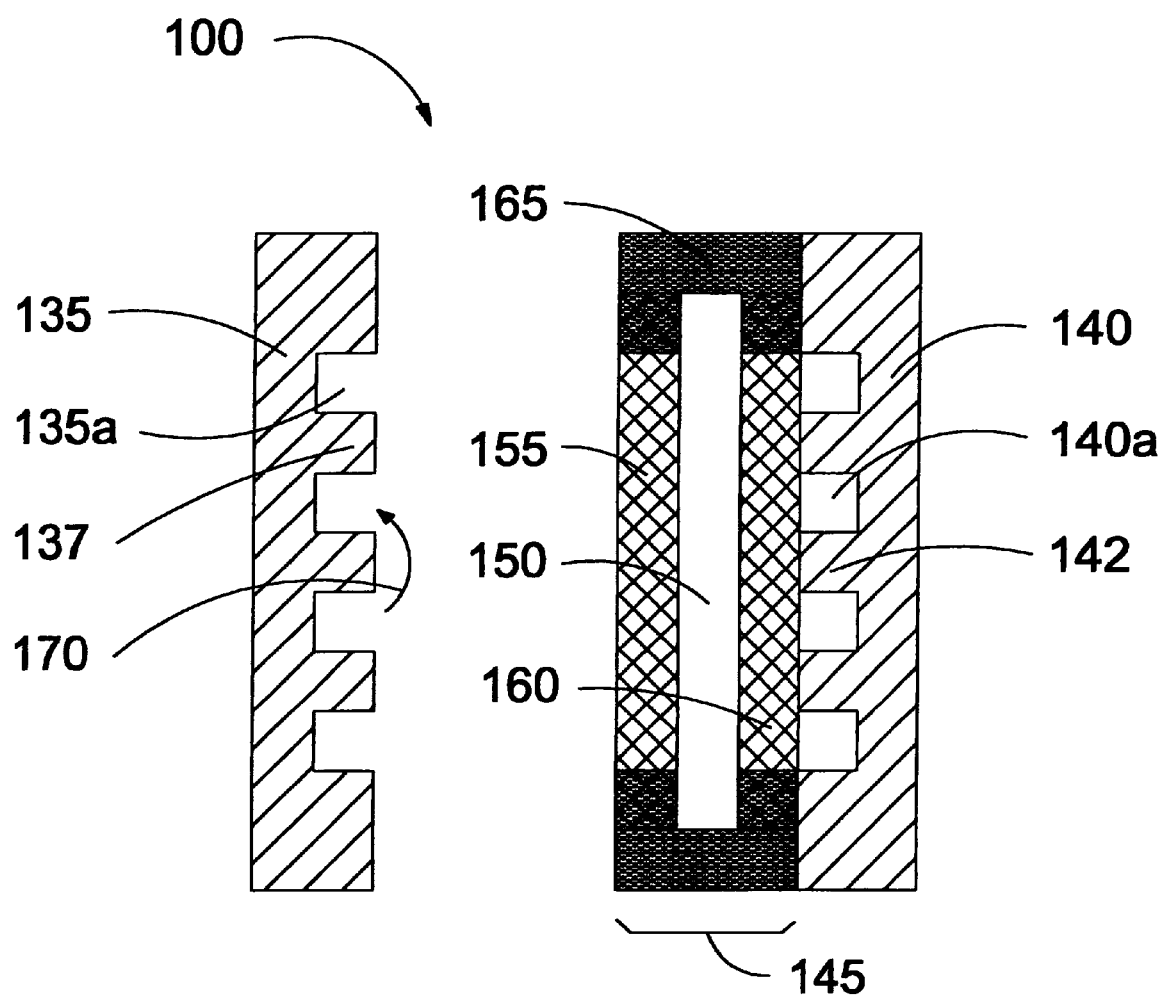
FIG. 2 is an exploded schematic section view of a solid polymer fuel cell comprising a membrane electrode assembly interposed between two separator plates which each comprise a plurality of discrete fluid distribution channels.

FIG. 2 is an exploded schematic section view of a fuel cell 100 (not to scale) that comprises anode flow field plate 135, a cathode flow field plate 140, and MEA 145 interposed therebetween. Anode flow field plate 135 comprises discrete fuel distribution channels 135a separated by land areas 137. Cathode flow field plate 140 comprises discrete oxidant distribution channels 140a separated by land areas 142.

MEA 145 comprises an electrolyte layer 150, interposed between fluid permeable anode 155 and fluid permeable cathode 160. Seals prevent the reactant fluids from leaking from the fuel cell assembly and from passing from one electrode to the other. For example, in the illustrated embodiment, a sealant material 165 encapsulates the edge regions of MEA 145 and impregnates an edge portion of anode 155 and cathode 160, thus providing a seal that is an integral part of MEA 145. Electrocatalyst (not shown) is disposed at the interfaces between electrolyte layer 150 and anode 155 and cathode 160.

With reference, for example, to anode flow field plate 135, discrete fuel distribution channels 135a, improve the utilization of catalyst in the electrochemically active area of anode 155 because there are no fluid passages between discrete fuel distribution channels 135a within the thickness of plate 135. Therefore, the pressure differential between the fuel inlet (not shown in FIG. 2) and the fuel outlet (not shown in FIG. 2) directs the fuel fluid through the fluid permeable anode from one discrete fluid distribution channel 135a to the next (see arrow 170). In this manner, discrete fluid distribution channels 135a assist in distributing the fuel fluid to areas of anode 155 adjacent land areas 137 all along the length of discrete channels 135a, in addition to areas of anode 155 directly adjacent discrete fuel distribution channels 135a. Accordingly, a benefit of employing discrete fluid distribution channels 135a is improved catalyst utilization at the anode, because contact between the fuel fluid and the anode electrochemically active area is promoted both in the portions of the anode that are adjacent fluid distribution channels 135a and the portions of the anode that are adjacent land areas 137. At cathode 160 discrete oxidant distribution channels 140a operate in a similar way to fuel distribution channels 135a, to also yield the improved fluid distribution and increased cathode catalyst utilization in the electrochemically active area of cathode 160.

The section view of FIG. 2 shows how, within the thickness of anode flow field plate 135 and cathode flow field plate 140, the respective discrete fluid distribution channels 135a and 140a are fluidly isolated from one other and from the inlet and outlet (not shown). In fact, as indicated above, it is this feature that provides improved fluid distribution.

Figure 3:
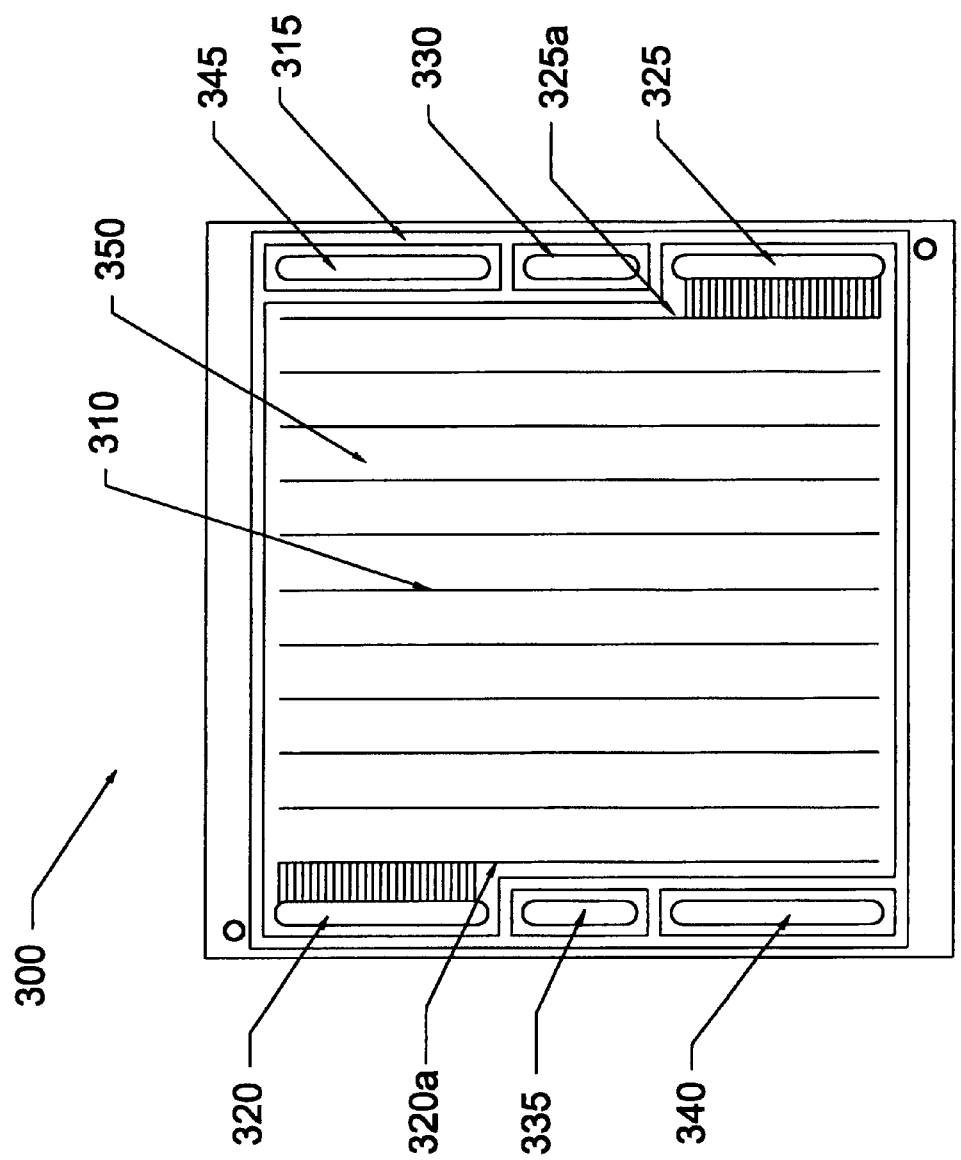
FIG. 3 is a plan view of a major surface of a fuel cell separator plate that comprises a plurality of discrete fluid distribution channels.

FIG. 3 shows an example of a fuel cell separator plate 300 that comprises a plurality of discrete fluid distribution channels 310. Groove 315 is provided for receiving a sealant material that may be, for example, a gasket or another sealant material that is deposited on the plate or the MEA. Openings 320 and 325, penetrate through plate 300 and align with openings in adjacent plates and MEAs to form fluid manifolds when plate 300 is part of a fuel cell stack (see, for example, FIG. 1). For example, openings 320 may supply oxidant to the fluid distribution area circumscribed by seal groove 315, and opening 325 may act as an oxidant outlet manifold for exhausting oxidant from the fluid distribution area. In this example, openings 330 and 335 may serve as a portion of respective fuel inlet and outlet manifolds, and openings 340 and 345 may serve as a portion of respective coolant inlet and outlet manifolds. As shown in FIG. 3, seal groove 315 also circumscribes openings 330, 335, 340 and 345 to prevent the oxidant stream from mixing with the fuel and coolant fluid streams.

FIG. 3 shows in plan view how land areas 350 fluidly isolate discrete fluid distribution channels 310 from one another within the thickness of the plate. Fluid distribution channels 310 extend substantially between opposing edges of the fluid distribution area, and are oriented substantially perpendicular to the direction of a straight line drawn between inlet manifold opening 320 and outlet manifold opening 325. Continuing the example where the reactant fluid supplied through opening 320 is an oxidant supply stream, oxidant inlet channel 320a receives oxidant from the oxidant stream inlet manifold (opening 320). The pressure loss sustained by the oxidant travelling from opening 320 to the outlet manifold (opening 325) by any direct path is theoretically the same. For example, the pressure loss sustained by a portion of the oxidant stream that travels to the furthest end of channel 320a and travels across the lower portion of plate 300 to opening 325 theoretically is the same pressure loss as a portion of the oxidant stream that travels across the top of plate 300 and down the length of outlet channel 325a which leads to outlet manifold opening 325. Similarly, the same pressure loss is theoretically sustained by the portion of the oxidant stream that travels across the middle of plate 300. Since the oxidant stream will tend to take the path which yields the lowest pressure loss, the path traveled between adjacent discrete fluid distribution channels 310 will generally be direct and substantially perpendicular to channels 310 (that is, the shortest path). The natural tendency for the fluid to travel along paths that will minimize the pressure loss prevents all of the oxidant from taking the same path and encourages a generally even fluid distribution since every path results in substantially the same theoretical pressure loss.

Figure 6:
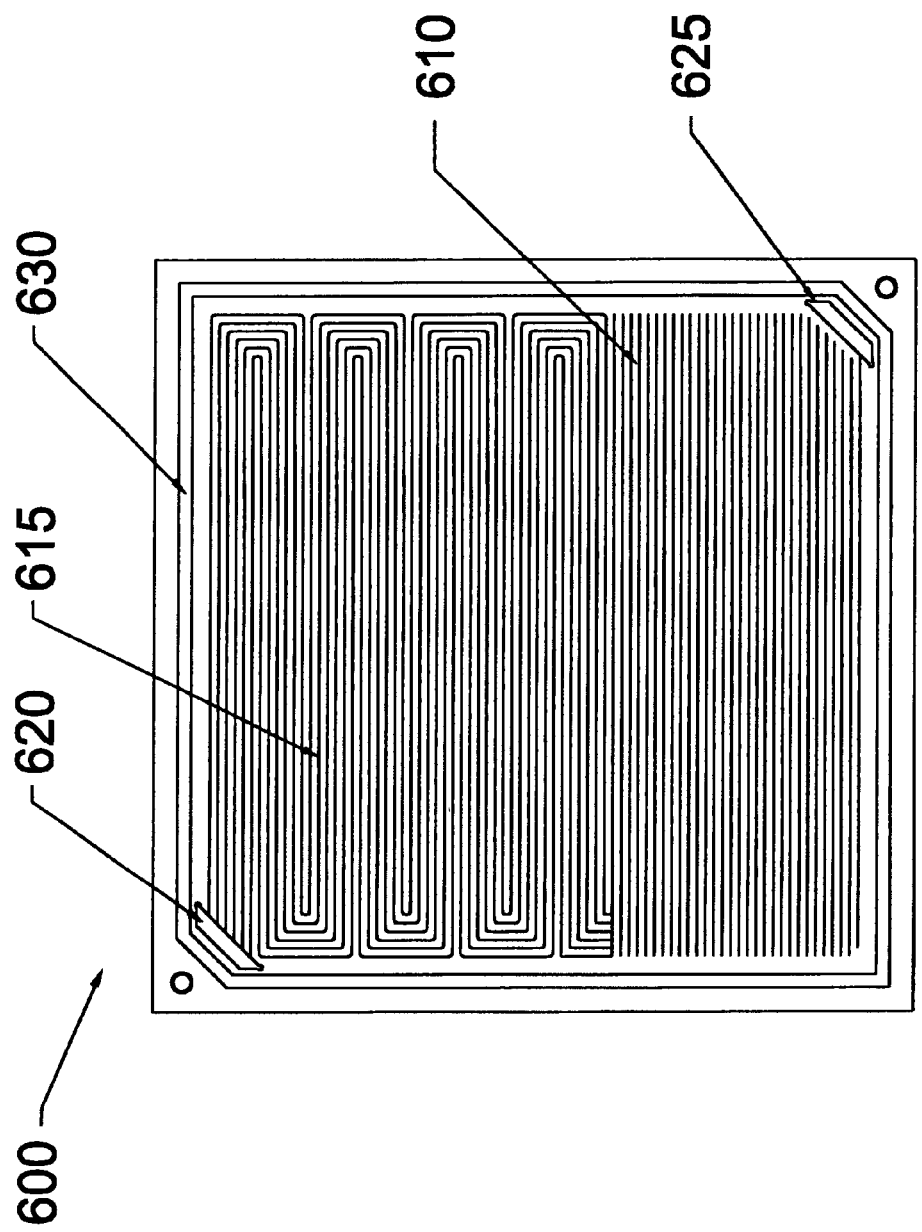
FIG. 6 is a plan view of a major surface of a fuel cell separator plate that comprises a plurality of discrete fluid distribution channels on a portion of the major surface and a serpentine channel that extends from a reactant fluid inlet.

In the illustrated example, plate 300 is a plate that is about 8.125 square inches (52.42 cm$^2$). In preferred embodiments, plate 300 may be made from a carbon composite material. Discrete fluid distribution channels 310 have centerlines that are spaced apart by 0.6 inch (1.52 cm) and channels 310 are 0.050 inch (0.127 cm) deep and 0.053 inch (0.135 cm) wide (that is, the land area between adjacent channels is about 0.547 inch (1.389 cm) wide). Those skilled in the art will understand that these preferred dimensions will vary from fuel cell to fuel cell. In addition, the examples of FIGS. 4 and 6 show that other spacing between discrete fluid distribution channels may be used, or that other shapes may be employed for the separator plate.

Figure 4:
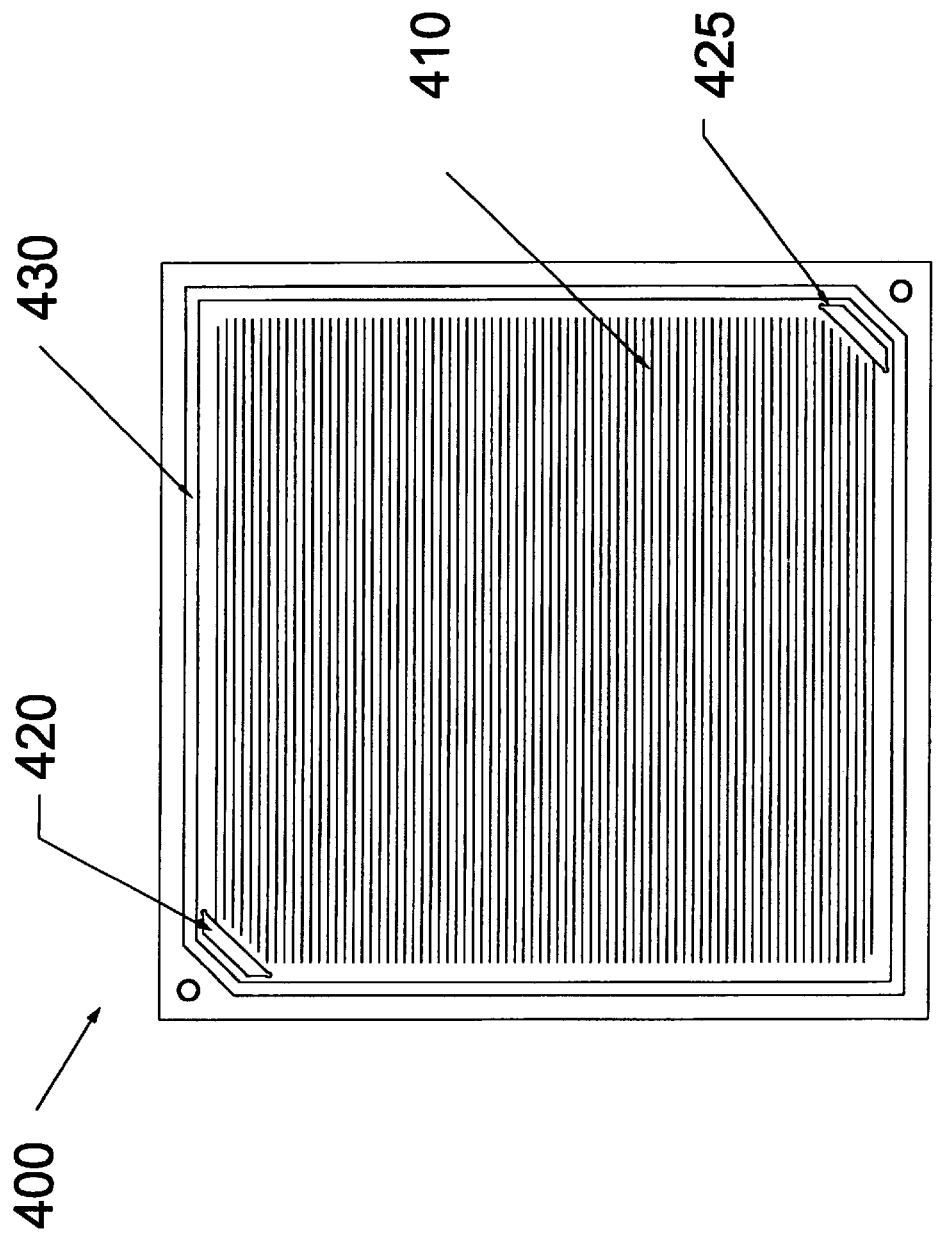
FIG. 4 is a plan view of a major surface of a fuel cell separator plate, similar in shape to the plate of FIG. 3, except that the discrete fluid distribution channels are more closely spaced.

In particular, FIG. 4 is a plan view of another embodiment of a fuel cell flow field plate 400 that comprises a plurality of discrete fluid distribution channels 410. In this embodiment, only two fluid carrying openings 420 and 425 are provided. Sealing area 430 provides a sealing surface for receiving a sealant material to provide a seal for containing the reactant fluid within the fluid distribution area.

In a single cell arrangement only two openings are required since each flow field plate 400 is interposed between the MEA and an end plate. Because flow field plate 400 has only two fluid openings (420 and 425), more of the plate area can be used for fluid distribution and the corresponding active area of the adjacent MEA may be made larger. In the example illustrated by FIG. 4, plate 400 is an 8.125 square inches (52.42 cm$^2$) plate made from a carbon composite material. In this example, discrete fluid distribution channels 410 are engraved in the major surface of plate 300. Discrete fluid distribution channels 410 are 0.05 inch (0.13 cm) deep and 0.053 inch (0.135 cm) wide. The spacing between the centerlines of adjacent discrete fluid distribution channels is 0.09 inch (0.23 cm) (that is, in this example, the width of the land areas between adjacent fluid distribution channels is 0.037 inch (0.094 cm). Compared to plate 300 shown in FIG. 3, which has similarly dimensioned discrete fluid distribution channels, the pressure loss for the fluid traveling across plate 400, would be lower across the same distance because there are more fluid distribution channels 410, and the pressure loss for the fluid to cross the open channel area is less than the pressure loss for the fluid to cross the land areas (through the thickness of the adjacent fluid permeable electrode). In general, the effect of the number of discrete fluid distribution channels depends upon the overall channel open area versus the overall land area since the pressure loss sustained by crossing the land areas is much greater than the pressure loss sustained in crossing the open channels. However, an important effect of increasing the number of discrete fluid distribution channels is that this generally improves fluid mobility in the transverse direction along the length of the channel.

Still with reference to FIG. 4, plate 400 may also be used in a fuel cell stack, For example, openings 420 and 425 may respectively serve as portions of the oxidant inlet and outlet manifolds. External manifolds may be employed to direct fuel to and from the fuel cell anodes, or plate 400 may be modified to add two more openings and appropriate sealing areas for providing internal fuel inlet and outlet manifolds. Plate 400 need not require cooling fluid manifolds, if, for example, the stack is air cooled or if one of the reactant streams acts as the coolant or if the coolant is comprised within one of the reactant fluid streams.

Figure 5:
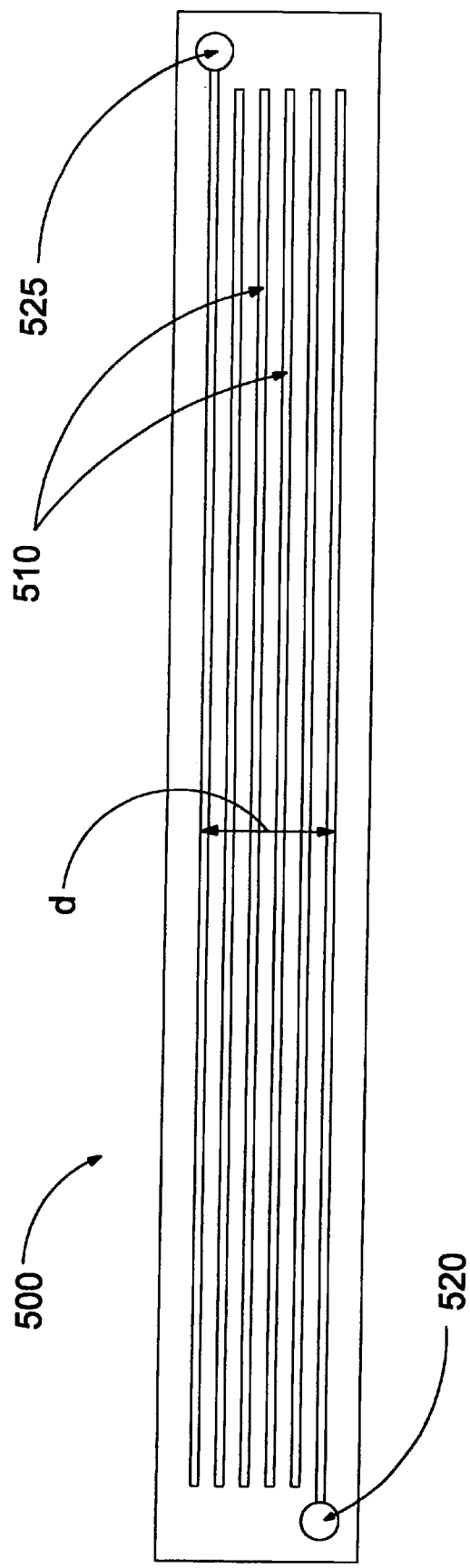
FIG. 5 is a plan view of a major surface of an elongated fuel cell separator plate that comprises a plurality of discrete fluid distribution channels, parallel to the longitudinal axis.

FIG. 5 illustrates an example of an elongated fuel cell fluid flow field plate 500 that comprises a plurality of discrete fluid distribution channels 510. Like in the other illustrated embodiments, discrete fluid distribution channels 510 extend substantially between opposite edges of plate 500 so that reactant fluid is directed to substantially the whole of the electrochemically active area of the adjacent electrode (not shown). Thus, in this case, channels 510 are oriented substantially parallel to the direction of a straight line drawn between inlet opening 520 and outlet opening 525. To prevent excessive pressure loss, discrete fluid distribution channels 510 are preferably oriented with their axes parallel to the longitudinal axis of elongated plate 500.

A reactant fluid may be supplied through inlet opening 520 and removed through outlet opening 525. Plate 500 demonstrates how the shape of the fluid flow field plate (and the shape of the corresponding fuel cell stack) may be manipulated to provide the desired electrochemically active area, and the desired pressure loss for the reactant fluid flowing across the flow field. Some degree of pressure loss is generally desirable to assist with transport of reactants and reactant products, such as water, through the cell. That is, the fluid stream will naturally flow from the areas where the fluid pressure is higher, near the inlet, to the areas near the outlet where fluid pressure is lower. For example, if the pressure loss from the inlet to the outlet is not high enough, the pressure differential may be too low to encourage water to travel towards the outlet. This may result in areas where water may accumulate and impede reactant access to the electrocatalyst sites, decreasing the effective electrocatalyst utilization within the adjacent electrode. In the example of FIG. 5, the pressure loss for the fluid travelling across flow field plate 500 is primarily determined by distance d, which is perpendicular to discrete fluid distribution channels 510. The pressure loss sustained by the fluid traveling over the land areas between discrete channels 510 causes the majority of the pressure loss since the pressure loss for the fluid to travel along open-faced discrete fluid distribution channels 510 is negligible compared to the pressure loss sustained when the fluid crosses over the land areas and passes through the adjacent fluid permeable electrode. Accordingly, the dimensions for fluid flow field plate 500 may be chosen to yield the desired pressure loss.

FIG. 6 illustrates another arrangement for a fuel cell separator plate 600 that comprises a hybrid fluid distribution area. Multiple, serpentine channels 615 are fluidly connected within the thickness of plate 600 to at least one of the fluid manifold openings 620 and/or 625. In this example, channels 615 extend over more than half of the fluid distribution area. Since the pressure loss sustained by the reactant fluid traveling through serpentine channels 615 is less than the pressure loss that would be sustained if the channels were discrete, a hybrid fluid distribution area may be employed to yield the desired pressure loss for a given flow field area.

For example, when a flow field plate is designed, the number of channels connected to the inlet or outlet openings and area covered by the channels may be selected to provide a particular pressure loss for a given reactant flow rate. That is, the proportion of open channel area for channels directly connected to an inlet or outlet opening versus the discrete open channel area may be selected to provide the desired degree of pressure loss for the fluid distribution area.

With reference to FIG. 6, opening 620 may be, for example, the oxidant inlet manifold opening, for supplying a dilute oxidant stream, such as air. Multiple serpentine channels 615 are fluidly connected to inlet manifold opening 620. In the illustrated example, channels 615 extend over approximately two thirds of the fluid distribution area. When air is first introduced into channels 615, the air stream at this point has the highest pressure and the highest concentration of reactant, (namely oxygen). Accordingly, by employing multiple serpentine channels 615 near the inlet, pressure loss is reduced in the region where the air stream is most easily diffused into the adjacent fluid permeable cathode, where the oxygen will contact the electrocatalyst that defines the electrochemically active area. When the air stream is more oxygen depleted (that is, nearer oxidant outlet manifold opening 625), the air stream is forced to pass through the adjacent fluid permeable cathode when the air stream crosses over the land areas between adjacent discrete fluid distribution channels 610, improving the contact between the depleted oxidant stream and the electrode.

Another advantage of locating discrete fluid distribution channels 610 nearer outlet manifold opening 625 is that this increases the pressure differential in this region. At the cathode, water produced by the desired electrochemical reactions generally accumulates within the oxidant stream as it approaches the outlet manifold. By employing discrete fluid distribution channels 610 near oxidant outlet manifold opening 625, a higher pressure differential is induced which helps to direct the water to outlet manifold opening 625.

Like the other separator plates shown in FIGS. 3 and 4, plate 600 also comprises an area 630 for receiving a sealant material for containing the reactant fluid within the desired fluid distribution area.

Fuel cell separator plates incorporating the disclosed features may be made from any materials that are suitable for fuel cell separator plates. Preferred properties for fuel cell separator plate materials include impermeability to reactant fluids, electrical conductivity, chemical compatibility with fuel cell reactant fluids and coolants, and physical compatibility with the anticipated operating environment, including temperature and the humidity of the reactant streams. For example, carbon composites have been disclosed herein as suitable materials. Expanded graphite composites may also be suitable materials. The disclosed discrete fluid distribution channels may be formed, for example, by embossing a sheet of expanded graphite material. Composite plate materials may further comprise a coating to improve one or more of the plate's desired properties. Persons skilled in the art will understand that the present separator plates may be made from other materials that are used to make conventional separator plates, such as, for example, metal.

In this disclosure, the terms "flow field plate" and "separator plate" have been used interchangeably. That is, a separator plate may be a flow field plate, and vice versa. However, the term separator plate has been used more in the context of fuel cell stacks, and the term flow field plate has been used more in the context of a single fuel cell, where the flow field plates do not actually serve as "separators" between adjacent fuel cells.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. An electrically conductive, substantially fluid impermeable separator plate for an electrochemical cell, said plate comprising:
    (a) a substantially planar major surface for facing a fluid permeable electrode of said electrochemical cell;
    (b) a fluid inlet through which a fluid may be directed to said planar major surface;
    (c) a fluid outlet through which fluid may be removed from said planar major surface;
    (d) at least one discrete fluid distribution feature formed in said planar major surface and not extending through the thickness of said plate,
wherein, within the thickness of said plate, said fluid distribution feature is fluidly isolated from said fluid inlet and said fluid outlet.

2. The separator plate of claim 1 wherein said discrete fluid distribution feature is a discrete channel.

3. The separator plate of claim 2 wherein said discrete fluid distribution channel is oriented substantially perpendicular to the direction of fluid flow into and out of said discrete fluid distribution channel.

4. The separator plate of claim 2 wherein said discrete fluid distribution channel is oriented substantially perpendicular to a straight line drawn between said fluid inlet and said fluid outlet.

5. The separator plate of claim 2 wherein said discrete fluid distribution channel is oriented substantially parallel to a straight line drawn between said fluid inlet and said fluid outlet.

6. The separator plate of claim 2 wherein said substantially planar major surface comprises a fluid distribution area and said discrete distribution channel is a substantially straight channel that extends substantially between opposing edges of said fluid distribution area.

7. The separator plate of claim 6 wherein said fluid distribution area is substantially in the shape of a rectangle and said discrete fluid distribution channel is substantially aligned with the longitudinal axis of said fluid distribution area.

8. The separator plate of claim 2 further comprising at least one inlet channel formed in said planar major surface that extends from said fluid inlet.

9. The separator plate of claim 8 wherein said inlet channel is oriented substantially parallel to said discrete fluid distribution channel.

10. The separator plate of claim 2 further comprising at least one outlet channel formed in said planar major surface that extends from said fluid outlet.

11. The separator plate of claim 10 wherein said outlet channel is oriented substantially parallel to said discrete fluid distribution channel.

12. The separator plate of claim 2 wherein said discrete fluid distribution channel is formed by embossing a material comprising expanded graphite.

13. The separator plate of claim 2 wherein said plate is made from a molded composite material comprising carbon.

14. The separator plate of claim 13 wherein said discrete fluid distribution channel is formed using a die cutter.

15. The separator plate of claim 2 wherein said discrete fluid distribution channel has a substantially uniform cross-sectional area along its length.

16. The separator plate of claim 1 wherein said at least one discrete fluid distribution feature is one of a plurality of discrete fluid distribution channels.

17. The separator plate of claim 16 wherein said plurality of discrete fluid distribution channels are substantially parallel to one another.

18. The separator plate of claim 1 further comprising at least one serpentine fluid channel that extends from at least one of said fluid inlet and said fluid outlet, and extends over a portion of said planar major surface.

19. The separator plate of claim 1 wherein said plate further comprises openings penetrating said plate for forming fluid manifolds when said plate is one of a plurality of plates placed one on top of the other to form a fuel cell stack, and said openings are aligned in adjacent plates.

20. The separator plate of claim 1 wherein said plate is impregnated with resin.

21. The separator plate of claim 1 wherein said plate is hydrophobic.

22. An electrochemical fuel cell stack comprising:
(a) a plurality of membrane electrode assemblies comprising a pair of fluid permeable electrodes, wherein each one of said membrane electrode assemblies is interposed between planar major surfaces of two substantially fluid impermeable separator plates; and
(b) at least one discrete fluid distribution feature formed in one of said planar major surface of at least one of said two plates and not extending through the thickness of the respective one of said separator plates, wherein within the thickness of the respective one of said separator plates, said discrete fluid distribution feature is fluidly isolated such that it is not connected to a fluid inlet or a fluid outlet by any fluid conduits within the thickness of the respective one of said separator plates.

23. The electrochemical fuel cell stack of claim 22 wherein said discrete fluid distribution feature is a channel.

24. The electrochemical fuel cell stack of claim 23 wherein said at least one discrete fluid distribution channel is one of a plurality of discrete fluid distribution channels which are fluidly isolated within the thickness of the respective one of said flow field plates.

25. The electrochemical fuel cell stack of claim 24 wherein said plurality of fluid distribution channels are substantially parallel to one another.

26. The electrochemical fuel cell stack of claim 24 wherein said plurality of discrete fluid distribution channels are oriented substantially perpendicular to a straight line drawn between said fluid inlet and said fluid outlet.

27. The electrochemical fuel cell stack of claim 22 wherein said at least one fluid distribution channel is oriented substantially parallel to a straight line drawn between said fluid inlet and said fluid outlet.

28. The electrochemical fuel cell stack of claim 22 wherein the stack is a solid polymer fuel cell stack.

* * * * *